(12) United States Patent
Ueda

(10) Patent No.: US 11,584,114 B2
(45) Date of Patent: Feb. 21, 2023

(54) FOIL TRANSFER DEVICE TRANSFERRING FOIL FROM FILM

(71) Applicant: DGSHAPE Corporation, Hamamatsu (JP)

(72) Inventor: Jun Ueda, Hamamatsu (JP)

(73) Assignee: DGSHAPE CORPORATION, Shizuoka (JP)

( * ) Notice: Subject to any disclaimer, the term of this patent is extended or adjusted under 35 U.S.C. 154(b) by 640 days.

(21) Appl. No.: 16/654,423

(22) Filed: Oct. 16, 2019

(65) Prior Publication Data

US 2020/0122447 A1 Apr. 23, 2020

(30) Foreign Application Priority Data

Oct. 17, 2018 (JP) .............................. JP2018-195557

(51) Int. Cl.
| | | |
|---|---|---|
| B32B 37/00 | (2006.01) | |
| B44C 1/17 | (2006.01) | |
| B41J 2/45 | (2006.01) | |
| B32B 41/00 | (2006.01) | |
| B41J 2/447 | (2006.01) | |
| G03B 21/14 | (2006.01) | |

(52) U.S. Cl.
CPC ............ *B32B 37/025* (2013.01); *B32B 41/00* (2013.01); *B41J 2/447* (2013.01); *B41J 2/45* (2013.01); *B44C 1/1716* (2013.01); *B32B 2310/0843* (2013.01); *G03B 21/14* (2013.01)

(58) Field of Classification Search
CPC ..... B41J 11/007; B41J 13/103; B44C 1/1716; B44C 1/1729; B44B 5/0095; B44B 5/028; B41M 5/38242; B41M 5/46; H04N 1/00037; H04N 1/00082; H04N 1/00267; H04N 1/00262; H04N 1/00249; G03B 21/14

See application file for complete search history.

(56) References Cited

U.S. PATENT DOCUMENTS

| | | | | |
|---|---|---|---|---|
| 4,032,968 | A | * | 6/1977 | Miyoshi ................... H04N 9/31 348/784 |
| 6,771,395 | B1 | * | 8/2004 | Kito .................... H04N 1/19505 358/487 |
| 10,696,090 | B2 | * | 6/2020 | Takahashi ............. B41F 16/008 |
| 2018/0111402 | A1 | | 4/2018 | Takahashi |
| 2018/0139426 | A1 | * | 5/2018 | Ueda ..................... H04N 9/3182 |
| 2018/0205917 | A1 | * | 7/2018 | Ueda ..................... H04N 9/3105 |
| 2019/0001739 | A1 | * | 1/2019 | Takahashi ................ B41J 2/325 |
| 2020/0001594 | A1 | * | 1/2020 | Kuno .................. B41F 16/0093 |
| 2020/0122447 | A1 | * | 4/2020 | Ueda ........................ B41J 2/447 |

FOREIGN PATENT DOCUMENTS

| | | | | | |
|---|---|---|---|---|---|
| JP | | 5637371 | B2 | * 12/2014 | ........... G03H 1/0011 |
| JP | | 2018-069502 | A | 5/2018 | |

OTHER PUBLICATIONS

English translation of claims and description of JP2018069502.*
EIC search report (Year: 2022).*

* cited by examiner

Primary Examiner — Sonya M Sengupta
(74) Attorney, Agent, or Firm — Keating & Bennett, LLP

(57) ABSTRACT

A foil transfer device includes a first projector projecting light toward a foil film, and a second projector projecting light toward the foil film. The second projector and the first projector are staggered relative to each other.

6 Claims, 8 Drawing Sheets

FOIL TRANSFER DEVICE TRANSFERRING FOIL FROM FILM

CROSS REFERENCE TO RELATED APPLICATIONS

This application claims the benefit of priority to Japanese Patent Application No. 2018-195557 filed on Oct. 17, 2018. The entire contents of this application are hereby incorporated herein by reference.

BACKGROUND OF THE INVENTION

1. Field of the Invention

The present disclosure relates to foil transfer devices.

2. Description of the Related Art

Foil transfer devices that form an image on a surface of a substrate by projecting laser beams to the foil film to transfer a foil film onto a surface of a substrate are conventionally known (JP-A-2018-069502).

In the aforementioned transfer devices, a narrow laser beam or beams is/are projected to the foil film and the foil film is transferred of an image to be transferred on a pixel-by-pixel basis; thus, an image is formed on a substrate. Such pixel-by-pixel basis transferring could take a long time before completion of the transfer.

SUMMARY OF THE INVENTION

Preferred embodiments of the present invention provide foil transfer devices in which the time required for transfer is able to be reduced.

According to a preferred embodiment of the present invention, a foil transfer device includes a first projector and a second projector. The first projector projects light toward a foil film and the second projector projects light toward the foil film. The second projector and the first projector are arranged in a staggered configuration.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A and 4B are diagrammatic representations of a transfer unit according to a preferred embodiment with the carriage being omitted, in which FIG. 4A shows a configuration of a first projector and FIG. 4B shows a configuration of a second projector.

FIG. 6A shows the light absorbing unit at a standby position and FIG. 6B shows the light absorbing unit at a loading position, in which a vise is not illustrated for easier understanding.

DETAILED DESCRIPTION OF THE PREFERRED EMBODIMENTS

Figure 1:
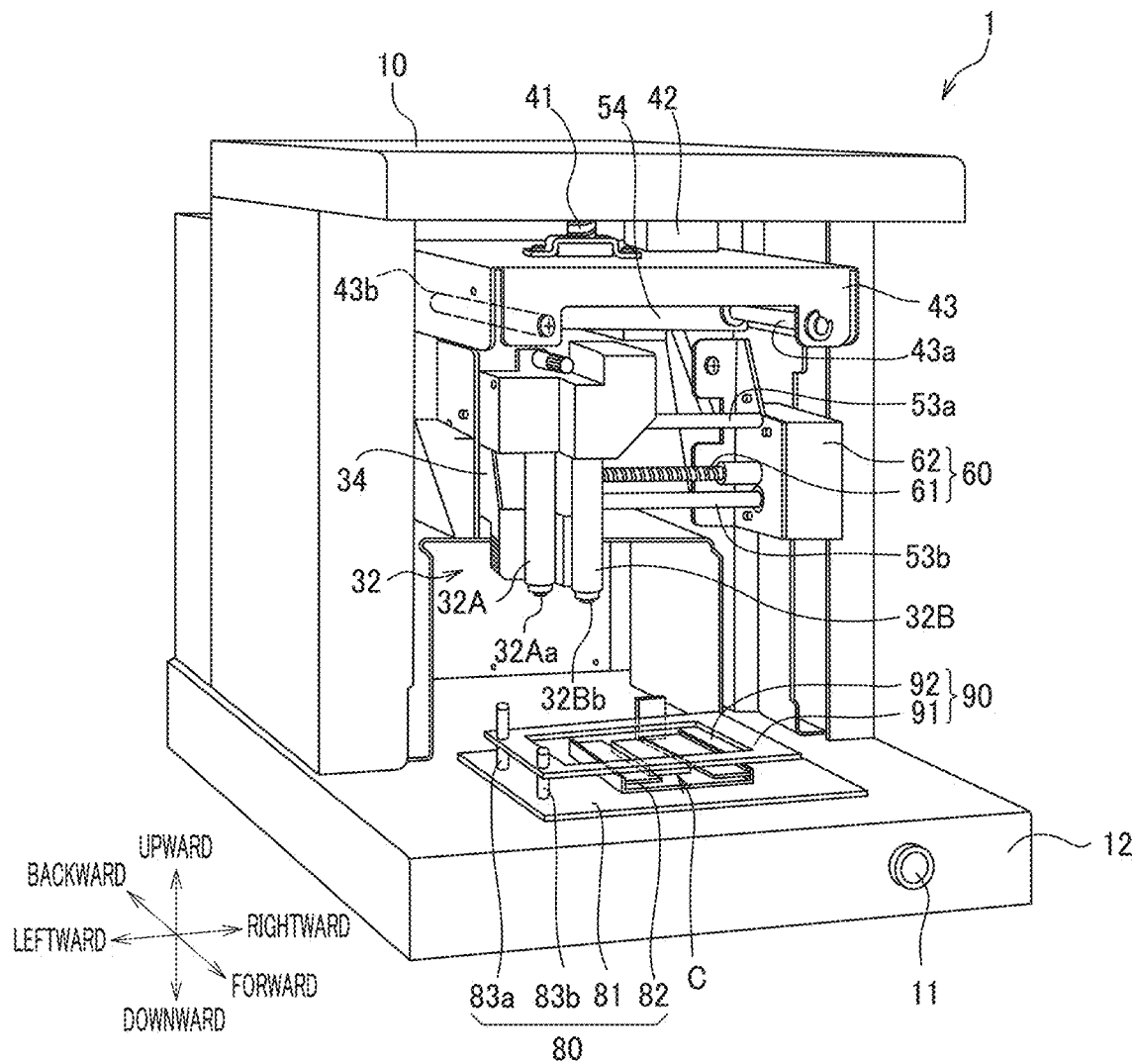
FIG. 1 is an external perspective view of a foil transfer device according to a preferred embodiment of the present invention.

Referring to FIGS. 1 to 8, a foil transfer device 1 according to a preferred embodiment of the present invention is described. The foil transfer device 1 according to this preferred embodiment is operable to transfer a foil film F onto a substrate C such that the foil film F has a certain shape by making a laser beam be scanned over the substrate C on which the foil film F has been laid. As shown in FIGS. 1 to 4, the foil transfer device 1 includes a housing 10, a controller 20, a transfer unit 30, an up/down direction driver 40, a back/forth direction driver 50, a right/left direction driver 60, a mounter 80, and a light absorber 90. The foil transfer device 1 is communicatively connected to an external computer 2 (see FIG. 5). Alternatively, the foil transfer device 1 itself may have the function of the computer 2.

The computer 2 generates data representing a scanning path along the shape of a certain image, design (such as an outline of a letter) to be transferred onto the substrate C and sends the data to the foil transfer device 1. The computer 2 that can be used is, for example, an ordinary personal computer. Scanning paths are created using a certain program that has been installed in advance on the computer 2.

Figure 2:
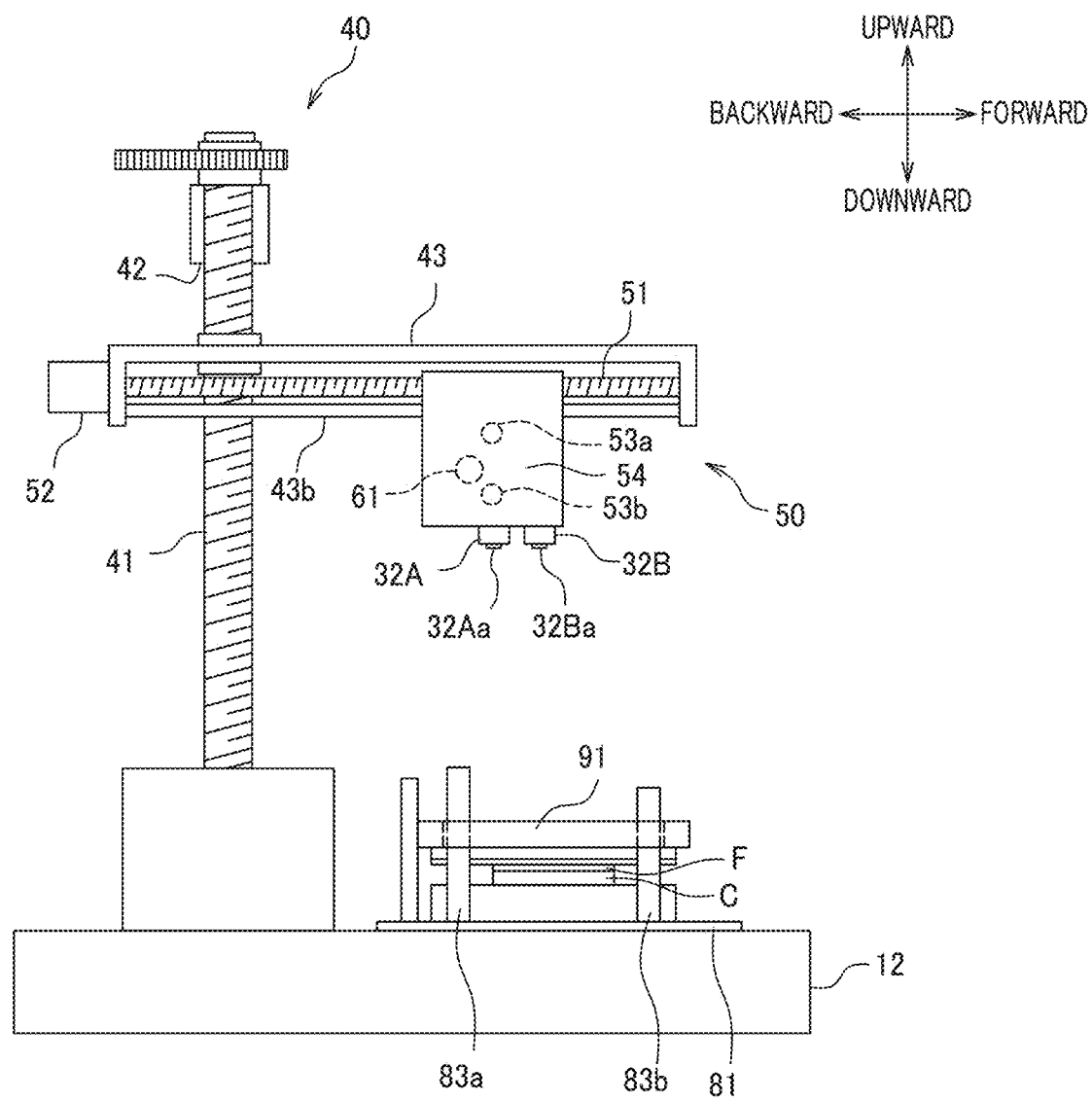
FIG. 2 is a left side view diagrammatically showing drive mechanisms in a preferred embodiment of the present invention.

As shown in FIGS. 1 and 2, the housing 10 includes a base 12. A power switch 11 that is electrically connected to the controller 20 is provided on the base 12. The mounter 80 is fixed to the upper surface of the base 12.

In this preferred embodiment, forward, backward, rightward, leftward, upward, and downward directions are defined as shown in FIG. 1. Specifically, the direction of disposing the power switch 11 on the housing 10 is defined as forward and the opposite is defined as backward. Rightward and leftward directions are defined as seen from the front of the housing 10. The side of the housing 10 where the base 12 is located is defined as downward and the opposite is defined as upward.

As shown in FIGS. 1 to 5, the transfer unit 30 is provided in the housing 10. The transfer unit 30 includes two laser oscillators 31A and 31B, a projector 32, optical fibers 33A and 33B, a carriage 34, and two thermometers 35A and 35B. The laser oscillators 31A and 31B are examples of the first and second light generators, respectively, according to a preferred embodiment of the present invention.

Figure 4A:
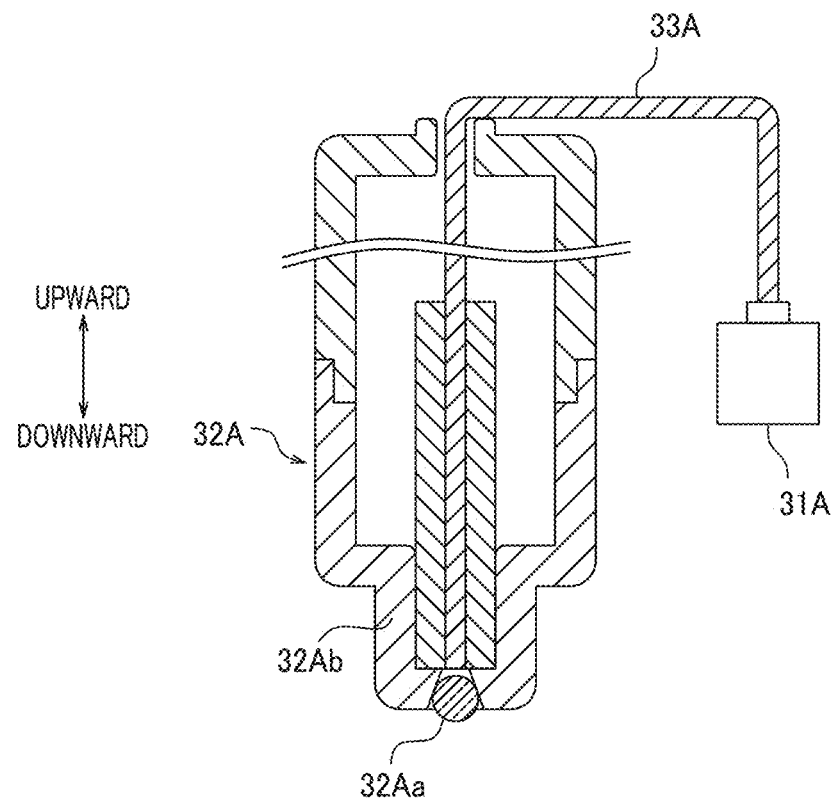
Figure 4B:
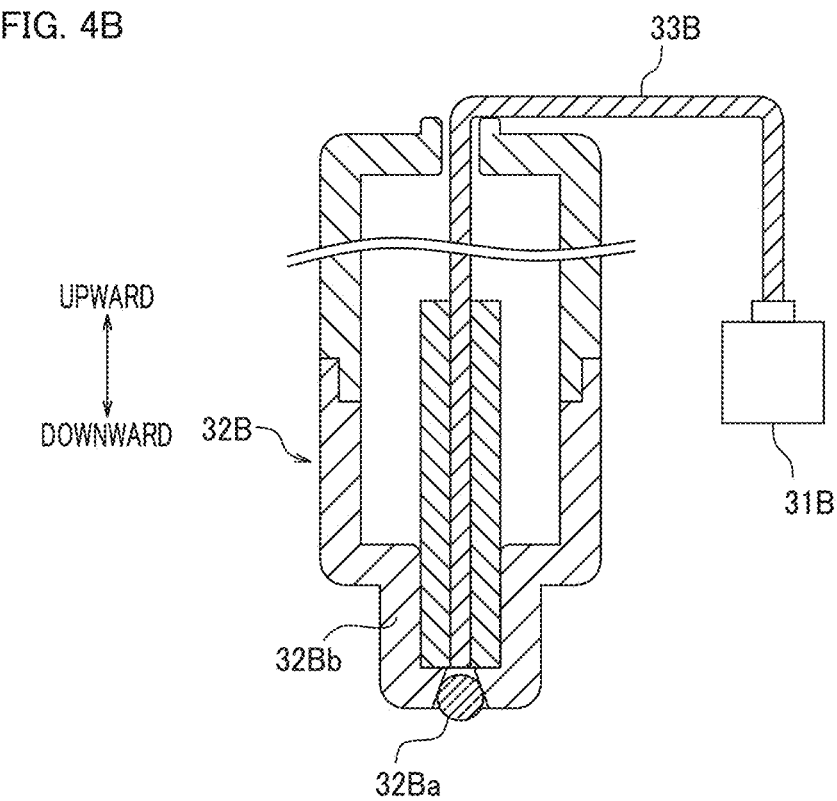

The laser oscillators 31A and 31B are a semiconductor laser oscillator and have a substantially similar structure (FIGS. 4A and 4B). Electric current passing through the laser oscillators 31A and 31B produces laser beams from the laser oscillators 31A and 31B. Regarding the performance of the laser oscillators 31A and 31B, they provide, for example, up to about 1 W of output power at the wavelength of about 450 nm. It should be noted that the laser oscillators 31A and 31B are not limited to a semiconductor laser; instead, a solid-state laser or a gas laser can also be used.

Figure 5:
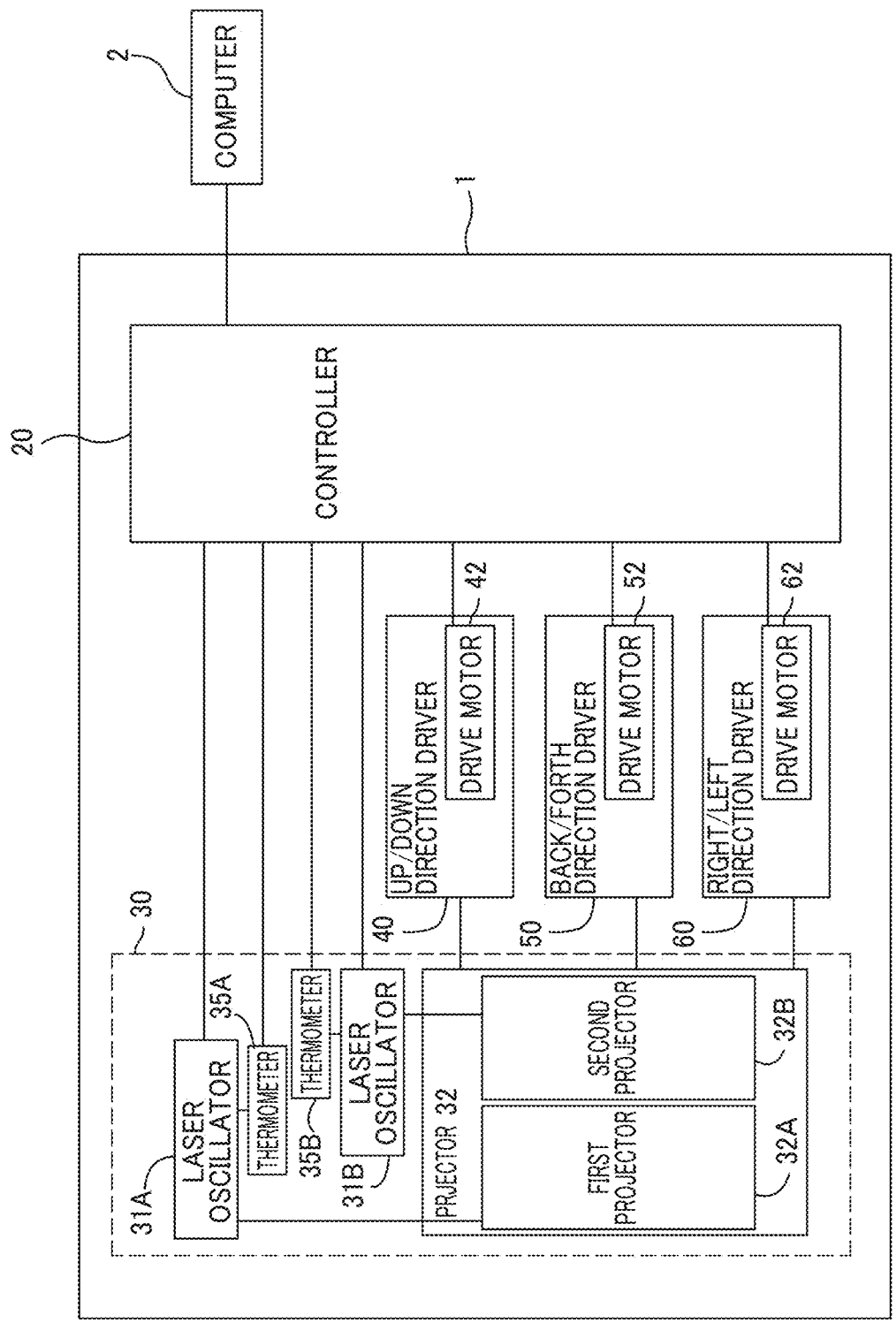
FIG. 5 is a block diagram illustrating functional connections in a foil transfer device according to a preferred embodiment of the present invention.

As shown in FIG. 5, thermometers 35A and 35B are provided in the laser oscillators 31A and 31B, respectively, and measure temperatures of the laser oscillators 31A and 31B. The thermometers 35A and 35B are electrically connected to the controller 20 and have a function of transmitting the measured temperatures to the controller 20 as electric signals.

Figure 3:
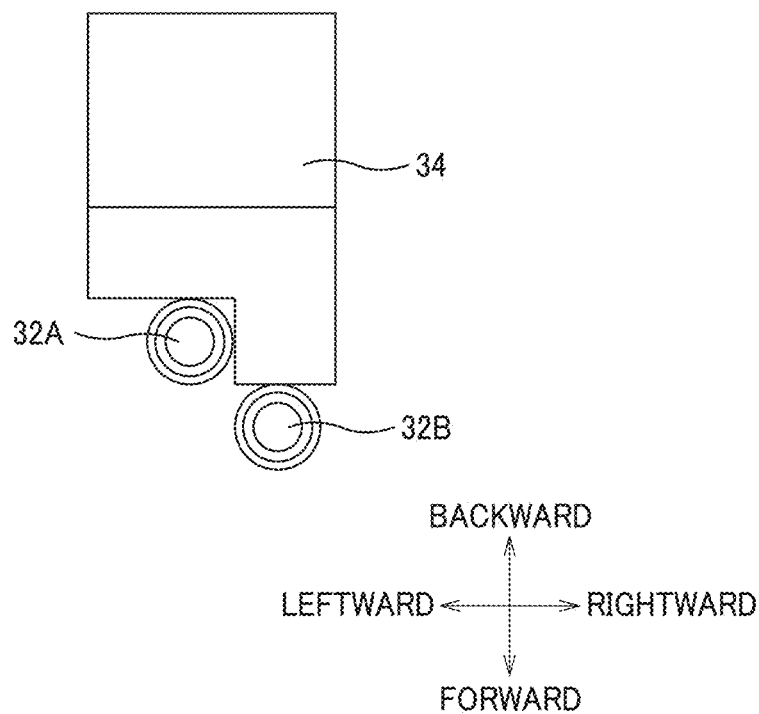
FIG. 3 is a bottom view of a projector and a carriage according to a preferred embodiment of the present invention.

As shown in FIGS. 1 to 5, the projector 32 includes a first projector 32A and a second projector 32B. As shown in FIG. 3, the first projector 32A and the second projector 32B are staggered with respect to each other when seen in the up/down direction. Specifically, the first projector 32A and the second projector 32B are not aligned to each other along the up/down and right/left directions, which are scanning directions during transfer processing. Since the first projector 32A and the second projector 32B are in staggered arrangement with respect to each other, the transfer processing can be performed simultaneously for two pixels, whether the projector 32 may scan on the substrate C in the back/forth direction or in the right/left direction. The first projector 32A and the second projector 32B are arranged at an appropriate distance from each other in order to avoid thermal effects.

As shown in FIGS. 4A and 4B, the first projector 32A and the second projector 32B have a substantially similar structure. The first projector 32A and the second projector 32B are optically connected to the laser oscillators 31A and 31B via the optical fibers 33A and 33B, respectively. The first projector 32A includes a lens 32Aa and a member 32Ab having a substantially hollow cylindrical shape which supports the lens 32Aa at its lower end and extends vertically. The second projector 32B includes a lens 32Ba and a member 32Bb having a substantially hollow cylindrical shape which supports the lens 32Ba at its lower end and extends vertically.

The lenses 32Aa and 32Ba in this preferred embodiment are made of a material transparent to laser beams and have a spherical shape. It should be noted that the shape of the lenses 32Aa and 32Ba is not limited to a spherical shape and may be a lens-like or hemispheric shape. The laser beams emerging from the laser oscillators 31A and 31B are guided to the first projector 32A and the second projector 32B, respectively, through the optical fibers 33A and 33B, and projected out through the lenses 32Aa and 32Ba. Transferring foil from the foil film F can be carried out by pressing the lenses 32Aa and 32Ba against the foil film F and the substrate C through the light absorber 90 and projecting laser beams.

There are two ways of transfer processing. One is a process in raster mode in which laser beams are emitted from both of the first projector 32A and the second projector 32B (hereinafter, also referred to as raster processing). The other is a process in vector mode in which a laser beam is emitted from one of the first projector 32A and the second projector 32B (hereinafter, also referred to as vector processing). The controller 20 or a user determines which one of the processes is to be used based on the status of the foil transfer device 1 or a structure of a transfer image.

As shown in FIG. 1, the carriage 34 holds the projector 32, that is, the first projector 32A and the second projector 32B, on the front side of the carriage 34. The carriage 34 is held in such a way that it can be driven by the right/left direction driver 60, the back/forth direction driver 50, and the up/down direction driver 40. With these drive mechanisms, the carriage 34 and the first and second projectors 32A and 32B held by the carriage 34 can move in three-dimensional directions relative to the substrate C.

The operations of the entire foil transfer device 1 are controlled by the controller 20. As shown in FIG. 5, the controller 20 controls the up/down direction driver 40, the back/forth direction driver 50, and the right/left direction driver 60 with being connected to them in such a way that the controller 20 can communicate with them. The controller 20 may have any configuration but, in this preferred embodiment, it mainly includes a read-only memory (ROM) in which programs are stored, a central processing unit (CPU) that executes programs, a random-access memory (RAM) that provides a work area for the processing by the CPU, and a non-volatile random-access memory (NVRAM) that retains data.

The controller 20 is configured or programmed to measure and store cumulative use times for the projector 32 and the laser oscillators 31A and 31B. Specifically, the controller 20 stores a cumulative use time T1 for the laser oscillator 31A and the first projector 32A and a cumulative use time T2 for the laser oscillator 31B and the second projector 32B. The controller 20 measures the use time whenever the laser oscillator 31A and the first projector 32A are used and add it to the cumulative use time T1. The controller 20 also measures the use time whenever the laser oscillator 31B and the second projector 32B are used and adds it to the cumulative use time T2.

The controller 20 is configured or programmed to monitor the temperatures of the laser oscillators 31A and 31B. The controller 20 receives the detected temperatures of the laser oscillators 31A and 31B from thermometers 35A and 35B. The controller 20 monitors whether the laser oscillators 31A and 31B are overheated or not by comparing each of the received detected temperatures with a predetermined threshold value.

The controller 20 is configured or programmed to control shading levels of pixels in foil transfer. The controller 20 controls each of the laser oscillators 31A and 31B to regulate energy of the light projected to the foil film F. The controller 20 analyzes the shading level of each pixel of a transfer image and calculates the magnitude of energy applied to each pixel. The energy applied to each pixel is regulated by light projection time.

Specifically, the controller 20 applies a pulse voltage to each of the laser oscillators 31A and 31B and controls the pulse width of the applied voltage. The controller 20 controls laser oscillation time per unit time of the laser oscillators 31A and 31B by controlling the pulse width. The controller 20 thus controls ratio of the laser projection times in the first projector 32A and the second projector 32B and controls the shading level of each pixel of the transfer image. Any shading level such as 256 shades or 512 shades can be used depending on conditions.

As shown in FIGS. 1 and 2, the up/down direction driver 40 includes an up/down direction drive shaft 41, a drive motor 42, and an up/down travel base 43. The up/down direction drive shaft 41 extends in the up/down direction and has a spiral thread running around it. An upper portion and a lower end portion of the up/down direction drive shaft 41 are supported by the housing 10 and the base 12, respectively, in a spinnable manner. The drive motor 42 is fixed to an upper portion of the housing 10 and is electrically connected to the controller 20. The output shaft of the drive motor 42 is mechanically connected to the up/down direction drive shaft 41 and can spin and drive the up/down direction drive shaft 41.

The up/down travel base 43 extends horizontally and is slidably supported by a slide shaft which extends vertically and is not shown. The up/down travel base 43 is in engagement with the spiral thread of the up/down direction drive shaft 41. When the up/down direction drive shaft 41 turns, the up/down travel base 43 moves in the up/down direction. The up/down travel base 43 has slide shafts 43*a* and 43*b* that extend in the back/forth direction.

The back/forth direction driver 50 has a back/forth direction drive shaft 51, a drive motor 52, and a slide base 54. The back/forth direction drive shaft 51 is attached to the up/down travel base 43 in such a way that it extends in the back/forth direction, and has a spiral thread running around it. The drive motor 52 is fixed to a rear portion of the up/down travel base 43 and is electrically connected to the controller 20. The output shaft of the drive motor 52 is connected to the rear end of the back/forth direction drive shaft 51 and can spin and drive the back/forth direction drive shaft 51.

The slide base 54 is in engagement with the spiral thread of the back/forth direction drive shaft 51. The slide base 54 is slidably supported by the slide shafts 43*a* and 43*b*. When the drive motor 52 is activated, the back/forth direction drive shaft 51 turns and the slide base 54 moves in the back/forth direction. The slide base 54 has slide shafts 53*a* and 53*b* that extend in the right/left direction.

The right/left direction driver 60 is coupled to the slide base 54. The right/left direction driver 60 has a right/left direction drive shaft 61 and a drive motor 62. The right/left direction drive shaft 61 extends in the right/left direction and has a spiral thread running around it. The output shaft of the drive motor 62 is mechanically connected to the right-hand end of the right/left direction drive shaft 61 and can spin and drive the right/left direction drive shaft 61. The drive motor 62 is electrically connected to the controller 20.

The right/left direction drive shaft 61 is in engagement with the spiral thread of the carriage 34. The slide shafts 53*a* and 53*b* slidably support the carriage 34. When the drive motor 62 is activated, the right/left direction drive shaft 61 turns and the carriage 34 is driven in the right/left direction along the slide shafts 53*a* and 53*b*.

As shown in FIGS. 1 and 2, the mounter 80 includes a plate-like workbench 81 secured to the top of the base 12, a vise 82 that is removably fixed to the workbench 81, and supports 83*a* and 83*b*. The vise 82 in this preferred embodiment includes a pair of members on the right and left sides and can firmly hold the substrate C. The vise 82 secures the substrate C on the base 12 by clamping the substrate C from its right and left sides.

Each of the supports 83*a* and 83*b* is a substantially solid-cylindrical member that is secured to the workbench 81 at its lower end and extends upward. An upper portion of the support member 83*a* pivotally holds the light absorber 90.

The light absorber 90 includes a frame 91 and a film 92. The frame 91 is a frame-shaped member having a rectangular shape when seen from the above and holds the film 92. The film 92 absorbs beams of light such as laser beams.

Figure 6A:
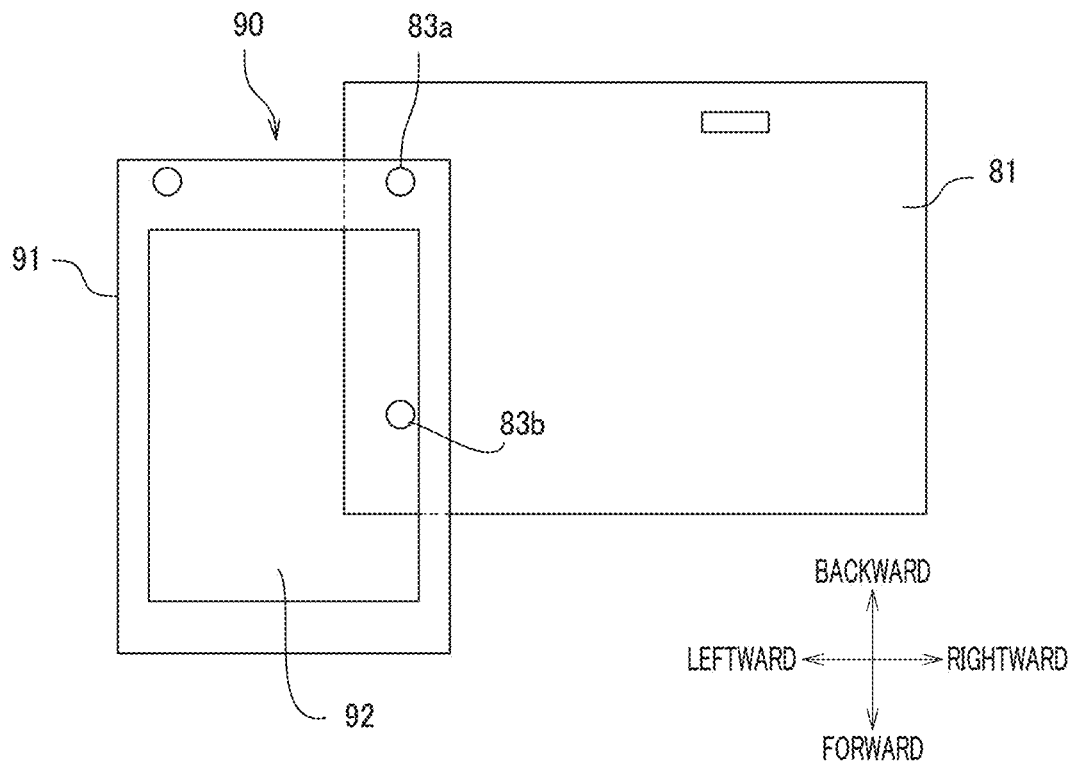
FIGS. 6A and 6B show top views of a mount unit and a light absorbing unit according to a preferred embodiment where
Figure 6B:
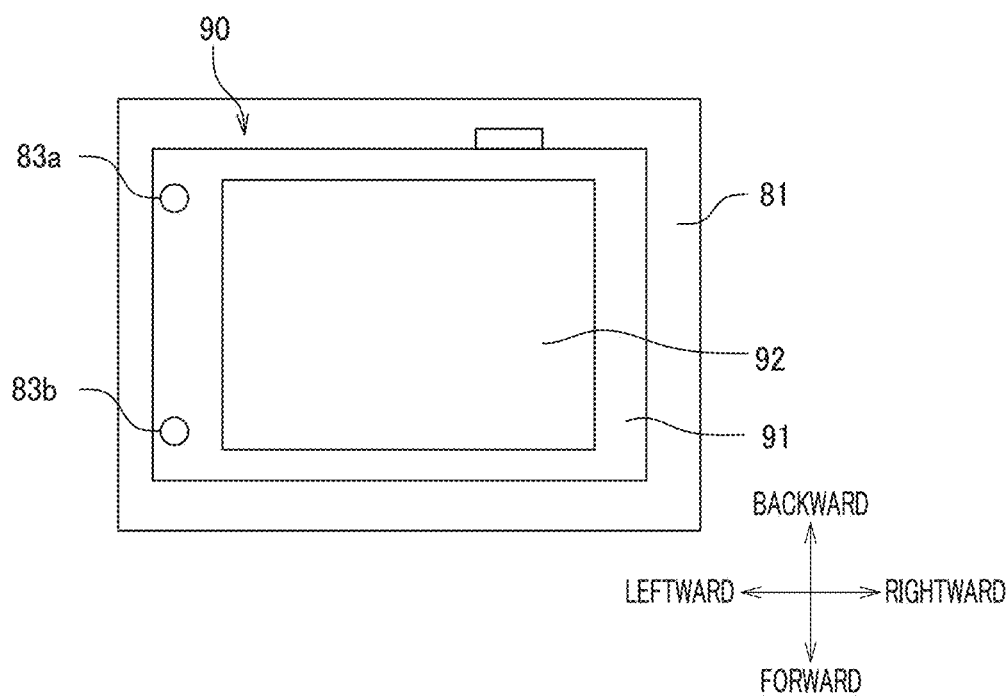

As shown in FIGS. 6A and 6B, the light absorber 90 is pivotally held by the support 83*a* and can turn substantially horizontally between a standby position (FIG. 6A) and a loading position (FIG. 6B). When the light absorber 90 comes to the loading position, the frame 91 engages with the support 83*b* and thus the light absorber 90 is fixed at the loading position.

The substrate C includes a substantially rectangular parallelepiped casing. The casing of the substrate C is made of a resin or metal. As the foil film F, a known metallic foil, a holographic foil, a magic mirror foil, a pigmented foil, a multicolor printing foil or the like is used.

Details of the processing in transferring foil from the foil film F onto the substrate C using the foil transfer device 1 are described below with reference to FIGS. 6A, 6B, 7, and 8.

First, the user places the light absorber 90 at the standby position (FIG. 6A). Next, the user secures the substrate C by clamping it with the vise 82 so that the substrate C is immobile relative to the base 12. After the substrate C has been secured, the user places the foil film F to cover the substrate C. Further, the user turns the light absorber 90 from the standby position to the loading position (FIG. 6B) to complete loading of the substrate C and the foil film F.

Figure 7:
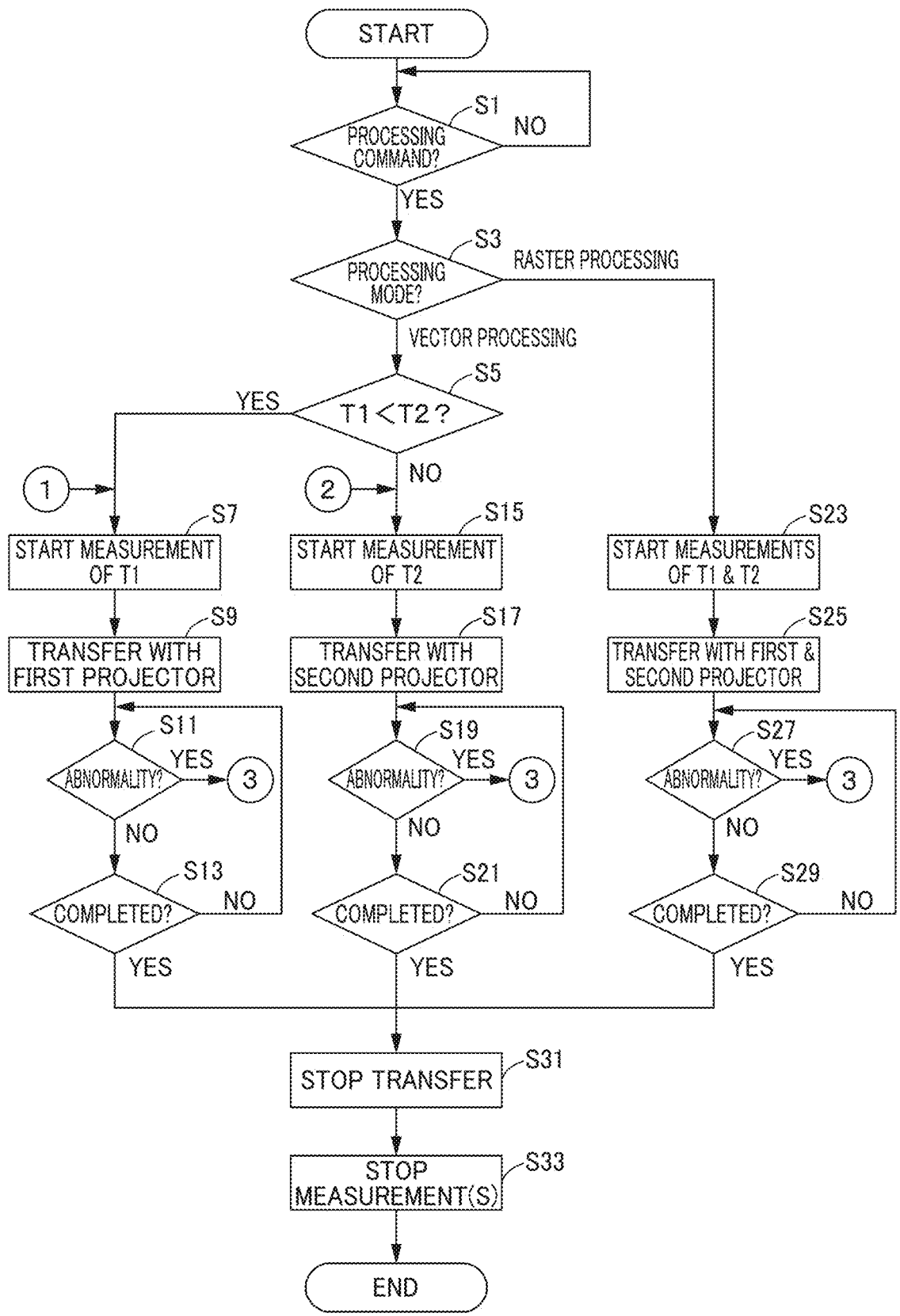
FIG. 7 is a flowchart illustrating a process performed by a controller according to a preferred embodiment of the present invention.
Figure 8:
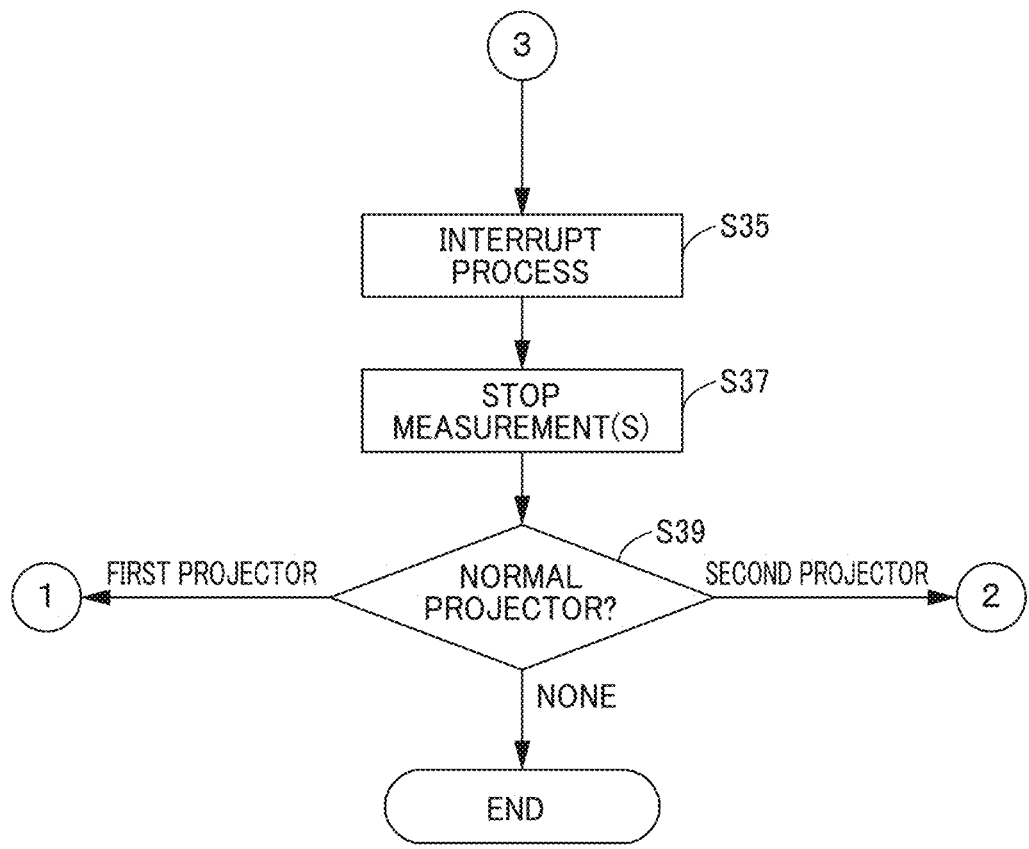
FIG. 8 is a flowchart illustrating a process in detecting abnormality among processes performed by a controller according to a preferred embodiment of the present invention.

After the completion of the loading of the substrate C and the foil film F, the user enters an image to be transferred using the computer 2. Then, the user commands the controller 20 to start as shown in FIGS. 7 and 8. The controller 20 is in the standby state until it receives a command from the user (S1: NO). In response to a command from the user (S1: YES), the controller 20 starts the following process. The operation of the controller 20 may be configured such that an operation unit is placed on the housing 10 and the operation is performed using this.

At step S3, the controller 20 determines the mode of the transfer processing. The controller 20 determines either the raster mode or the vector mode is used based on, for example, the configuration and shape of a transfer image. Note that the user may directly notify the controller 20 of the mode.

When determining that the processing is performed in the vector mode (S3: vector processing), the controller 20 compares the cumulative use time T1 with the cumulative use time T2 at step S5.

When the cumulative use time T1 is shorter than the cumulative use time T2 (S5: YES), the controller 20 proceeds the process to step S7 where it performs the process in the vector mode using the first projector 32A and the laser oscillator 31A.

At the step S7, the controller 20 starts measurement of the cumulative use time T1. Specifically, the controller 20 starts a step of counting up the cumulative use time T1 as the time during which the first projector 32A and the laser oscillator 31A are used.

Next, the controller 20 starts the transfer process with the first projector 32A at step S9. The controller 20 activates the laser oscillator 31A and projects a laser beam from the lens 32A*a* of the first projector 32A while controlling shading levels. At that time, the lens 32A*a* is in contact with the film 92 and is biased against the film 92, the foil film F, and the substrate C by a spring which is not shown. The laser beam is projected onto the foil film F through the film 92. The portion of the foil film F which is exposed to the laser beam is heated and transferred to the upper surface of the substrate C. At the same time, the controller 20 drives the up/down direction driver 40, the back/forth direction driver 50, and the right/left direction driver 60. As a result, the projector 32 moves and scans on the substrate C in three-dimensional directions and transfers the transfer image on a pixel-by-pixel basis.

At step S11, the controller 20 decides whether or not abnormality is present. The abnormality includes overheating of the laser oscillator 31A, and one or more failures of the transfer unit 30, the up/down direction driver 40, the back/forth direction driver 50, or the right/left direction driver 60. When determining that abnormality is present (S11: YES), the controller 20 proceeds the process to step S35 which is described later.

When determining that abnormality is not present (S11: NO), the controller 20 continues the transfer. At step S13, the controller 20 decides whether the image that should be transferred has completely been transferred. When the transfer of the image has not yet been completed (S13: NO), the controller 20 returns the process to the step S11 and continues the transfer.

When determining that the transfer image has completely been transferred (S13: YES), the controller 20 deactivates the laser oscillator 31A and stops the projection of the laser beam (S31). In addition, the controller 20 stops the measurement of the cumulative use time T1 (S33).

At the step S5, when the cumulative use time T1 is equal to or longer than the cumulative use time T2 (S5: NO), the controller 20 proceeds the process to step S15 where it performs the process in the vector mode using the second projector 32B and the laser oscillator 31B.

At the step S15, the controller 20 starts measurement of the cumulative use time T2. Specifically, the controller 20 starts a step of counting up the cumulative use time T2 as the time during which the second projector 32B and the laser oscillator 31B are used.

Next, the controller 20 starts the transfer with the second projector 32B at step S17. The controller 20 activates the laser oscillator 31B and projects a laser beam from the lens 32Ba of the second projector 32B while controlling shading levels. At that time, the lens 32Ba is in contact with the film 92 and is biased against the film 92, the foil film F, and the substrate C by a spring which is not shown. The laser beam is projected onto the foil film F through the film 92. The portion of the foil film F which is exposed to the laser beam is heated and transferred to the upper surface of the substrate C. At the same time, the controller 20 drives the up/down direction driver 40, the back/forth direction driver 50, and the right/left direction driver 60. As a result, the projector 32 moves and scans on the substrate C in three-dimensional directions and transfers the transfer image pixel by pixel.

At step S19, the controller 20 decides whether or not abnormality is present. The abnormality includes overheating of the laser oscillator 31B, and one or more failures of the transfer unit 30, the up/down direction driver 40, the back/forth direction driver 50, or the right/left direction driver 60. When determining that abnormality is present (S19: YES), the controller 20 proceeds the process to the step S35, described later.

When determining that abnormality is not present (S19: NO), the controller 20 continues the transfer. At step S21, the controller 20 decides whether the image that should be transferred has completely been transferred. When the transfer of the image has not yet been completed (S21: NO), the controller 20 returns the process to the step S19 and continues the transfer.

When determining that the transfer image has completely been transferred (S21: YES), the controller 20 deactivates the laser oscillator 31A and stops the projection of the laser beam (S31). In addition, the controller 20 stops the measurement of the cumulative use time T1 (S33).

When the controller 20 determines, at the step S3, that the processing is performed in the raster mode (S3: raster processing), the controller 20 proceeds the process to step S23 and starts measurements of both of the cumulative use time T1 and T2. The measurements of the cumulative use times T1 and T2 are as described for the steps S7 and S15.

The controller 20 starts, at step S25, transfer using both of the first projector 32A and the second projector 32B. The controller 20 activates both of the laser oscillators 31A and 31B and projects laser beams from the lens 32Aa and 32Ba of the first projector 32A and the second projector 32B, respectively, while controlling shading levels. At that time, the lens 32Aa is in contact with the film 92 and is biased against the film 92, the foil film F, and the substrate C by a spring which is not shown. At the same time, the controller 20 drives the up/down direction driver 40, the back/forth direction driver 50, and the right/left direction driver 60. As a result, the projector 32 moves and scans on the substrate C in three-dimensional directions and transfers the transfer image for two pixels at a time.

At step S27, the controller 20 decides whether or not abnormality is present. The abnormality includes overheating of the laser oscillator 31A or 31B, and one or more failures of the transfer unit 30, the up/down direction driver 40, the back/forth direction driver 50, or the right/left direction driver 60. When determining that abnormality is present (S27: YES), the controller 20 proceeds the process to step S35 which is described later.

When determining that abnormality is not present (S27: NO), the controller 20 continues the transfer. At step S29, the controller 20 decides whether or not the image that should be transferred has completely been transferred. When the transfer of the image has not yet been completed (S29: NO), the controller 20 returns the process to the step S27 and continues the transfer.

When determining that the transfer image has completely been transferred (S29: YES), the controller 20 deactivates both of the laser oscillators 31A and 31B and stops the projection of the laser beam (S31). In addition, the controller 20 stops the measurements of the cumulative use times T1 and T2 (S33).

When detecting abnormality (S11: YES, S19: YES, or S27: YES), the controller 20 stops, at the step S35, all of the components and devices which are in service and interrupts the process. In addition, the controller 20 stops the measurements of the cumulative use times T1 and T2 at step S37.

Next, the controller 20 decides whether or not there is the projector that can be used normally. When determining that the second projector 32B can be used normally (S39: second projector), the controller 20 proceeds the process to the step S15. In this way, the controller 20 restarts the transfer processing in the vector mode using the second projector 32B. As one example of the above determination, when the laser oscillator 31A is overheated while the laser oscillator 31B can be used normally and no other components or portions have any trouble, the controller 20 decides that second projector 32B can be used normally.

On the other hand, when determining that the first projector 32A can be used normally (S39: first projector), the controller 20 proceeds the process to the step S7. In this way, the controller 20 restarts the transfer processing in the vector mode using the first projector 32A. As one example of the above determination, when the laser oscillator 31B is overheated while the laser oscillator 31A can be used normally and no other components or parts have any trouble, the controller 20 decides that first projector 32A can be used normally.

When determining that neither the first projector 32A nor the second projector 32B can be used normally (S39: none), the controller 20 terminates the process. For example, this determination is made when both of the laser oscillators 31A and 31B have been overheated or when one or more other components such as the up/down direction driver 40 have a trouble and the projector 32 cannot scan.

In this preferred embodiment, two projectors preferably are used. However, three or more projectors that are arranged staggered with respect to each other can be used. In this preferred embodiment, a step or determining whether or not abnormality is present may be added immediately after the step S1. By using such a configuration, the controller 20 can determine, before the transfer is started, whether or not execution in the raster mode or the vector mode can be made, or which one of the projectors is used in the vector mode.

At the step S5, when the cumulative use time T1 is equal to the cumulative use time T2, either one of the projectors can be used. Alternatively, a predetermined one of the projectors may be used. At the step S5, the projector whose temperature is lower may be given priority as the projector to be used.

In this preferred embodiment, two thermometers 35A and 35B are provided to detect the temperatures of the laser oscillators 31A and 31B, respectively. However, the present invention is not limited to such a configuration. A single thermometer may detect the temperatures of the laser oscillators 31A and 31B.

While the configuration in which the laser oscillators 31A and 31B are used as the light generators for transfer has been described in this preferred embodiment, the present invention is not limited to such a configuration. For example, in place of the laser oscillators 31A and 31B, light-emitting diodes can be used. Alternatively, not limited to the light-emitting diodes, it is also possible to use elements or similar devices of which light output can be changed by changing the electric current flowing therethrough. It is also possible to use a mechanism compatible with hot stamping methods or heat pen methods for the transfer unit 30. It is also possible to perform transfer processing without using the light absorber 90.

While this preferred embodiment has been described in conjunction with the case in which only the projector 32 is moved, the present invention is not limited to such a configuration. That is, foil transfer may be performed by moving, relative to the fixed projector 32, the mounter 80 in the back/forth, right/left, and up/down directions. In this case, the up/down direction driver 40, the back/forth direction driver 50, and the right/left direction driver 60 drive the mounter 80 (for example, a drive motor to move the mounter 80 in three axial directions). Alternatively, both of the projector 32 and the mounter 80 may be moved.

Furthermore, the shape of the casing of the substrate C in the present invention is not limited to a rectangular parallelepiped shape as in the present preferred embodiment, and each side surface may be formed by a curved surface.

The foil transfer device 1 includes the first projector 32A that projects light toward the foil film F; and the second projector 32B that projects light toward the foil film F. The first projector 32A and the second projector 32B are arranged in a staggered configuration.

Since the foil transfer device 1 includes two projectors that are staggered with respect to each other, it is possible to transfer two pixels at the same time. Therefore, compared with devices using a single projector, the foil transfer device 1 can provide a higher transfer speed and a shorter transfer time.

The foil transfer device 1 includes the controller 20 that is capable of executing raster processing to transfer the foil film F to the substrate C using the first projector 32A and the second projector 32B; and vector processing to transfer the foil film F to the substrate C using one of the first projector and the second projector.

In the foil transfer device 1, the optimum processing method can be selected depending on the status of the device and the structure of the transfer image. For this reason, it is possible to perform flexible transfer processing depending on the device's status and user requirements, such as giving priority to the quality of transfer processing or giving priority to the speed of transfer work.

The controller 20 uses one of the first projector 32A and the second projector 32B with a shorter cumulative use time in the vector processing.

With the aforementioned configuration, it is possible to reduce a difference in use time between the projectors by giving priority to the projector with a shorter cumulative use time.

In case that the controller 20 detects abnormality in the vector processing, the vector processing is continued using one of the first projector 32A and the second projector 32B which can be used normally. In addition, in case that the controller 20 detects abnormality in the raster processing, the raster processing is switched to the vector processing using one of the first projector 32A and the second projector 32B which can be used normally.

With the aforementioned configuration, the transfer processing can be continued even when abnormality occurs. Thus, a highly durable foil transfer device 1 that can perform processing in a stable manner even in an accidental contingency can be provided.

The foil transfer device 1 further includes the laser oscillator 31A which is optically connected to the first projector 32A and which emits light, and the laser oscillator 31B which is optically connected to the second projector 32B and which emits light. The controller 20 detects abnormality by detecting the temperature of the laser oscillator 31A or the laser oscillator 31B.

With the aforementioned configuration, overheating that can be a cause of abnormal output can be detected appropriately.

The controller 20 separately controls shading levels of pixels of the transfer image transferred by the first projector 32A and shading levels of pixels of the transfer image transferred by the second projector 32B.

With the aforementioned configuration, two pixels can be transferred at the same time even when these pixels have different shading levels. Accordingly, quick transfer processing can be executed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A foil transfer device comprising:
a first projector to project light toward a foil film;
a second projector to project light toward the foil film;
a controller configured or programmed to execute:
transferring, in raster processing, foil from the foil film to a substrate using the first projector and the second projector; and
transferring, in vector processing, foil from the foil film to the substrate using one of the first projector and the second projector, wherein
the second projector and the first projector are staggered relative to each other.
2. The foil transfer device according to claim 1, wherein the controller is configured or programmed to use one of the first projector and the second projector with a shorter cumulative use time in the vector processing.

3. The foil transfer device according to claim 1, wherein in a case where the controller detects an abnormality in the vector processing, the controller is configured or programmed to execute continuing the vector processing by using one of the first projector and the second projector which is capable of being used normally.

4. The foil transfer device according to claim 1, wherein in a case where the controller detects abnormality in the raster processing, the controller is configured or programmed to execute switching the raster processing to the vector processing by using one of the first projector and the second projector which is capable of being used normally.

5. The foil transfer device according to claim 3 further comprising:
   a first light generator to emit light and optically connected to the first projector; and
   a second light generator to emit light and optically connected to the second projector; wherein
   the controller detects the abnormality by measuring a temperature of the first light generator or the second light generator.

6. The foil transfer device according to claim 1, wherein the controller is configured or programmed to separately control shading levels of pixels of a transfer image transferred by the first projector and shading levels of pixels of the transfer image transferred by the second projector.

* * * * *